(12) United States Patent
Yamashita et al.

(10) Patent No.: US 9,190,804 B2
(45) Date of Patent: Nov. 17, 2015

(54) PULSE LIGHT SOURCE, AND METHOD FOR STABLY CONTROLLING PHASE DIFFERENCE BETWEEN PULSE LASER LIGHTS

(71) Applicant: ADVANTEST CORPORATION, Tokyo (JP)

(72) Inventors: Tomoyu Yamashita, Miyagi (JP); Akiyoshi Irisawa, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 14/413,443

(22) PCT Filed: Jul. 19, 2013

(86) PCT No.: PCT/JP2013/070265
§ 371 (c)(1),
(2) Date: Jan. 8, 2015

(87) PCT Pub. No.: WO2014/024699
PCT Pub. Date: Feb. 13, 2014

(65) Prior Publication Data
US 2015/0194786 A1 Jul. 9, 2015

(30) Foreign Application Priority Data
Aug. 7, 2012 (JP) ................ 2012-174825

(51) Int. Cl.
*H01S 3/13* (2006.01)
*H01S 3/137* (2006.01)
(Continued)

(52) U.S. Cl.
CPC .............. *H01S 3/13* (2013.01); *H01S 3/10046* (2013.01); *H01S 3/10053* (2013.01);
(Continued)

(58) Field of Classification Search
CPC ... H01S 3/137; H01S 3/1307; H01S 3/10053; H01S 3/10046
USPC .................. 372/32, 29.02, 29.022
See application file for complete search history.

(56) References Cited

U.S. PATENT DOCUMENTS 4,685,111 A 8/1987 Baer
5,778,016 A * 7/1998 Sucha et al. ................. 372/38.1
(Continued)

FOREIGN PATENT DOCUMENTS

DE 102011087725 6/2012
DE 102011087881 6/2012
(Continued)

OTHER PUBLICATIONS

International Search Report, mailed Oct. 29, 2013 for Patent Application No. PCT/JP2013/070265.
(Continued)

*Primary Examiner* — Kinam Park
(74) *Attorney, Agent, or Firm* — Greenblum & Bernstein P.L.C.

(57) ABSTRACT

A pulse light source includes: a master laser that outputs a master laser light pulse whose repetition frequency is controlled to a predetermined value; a slave laser that outputs a slave laser light pulse; a phase comparator that detects a phase difference between an electric signal having a frequency of the predetermined value, and an electric signal based on a light intensity of the slave laser light pulse; a loop filter; an adder that adds a repetition frequency control signal having a certain repetition cycle, to an output from the loop filter; and a phase comparator that measures a pulse phase difference which is a phase difference between the master laser light pulse and the slave laser light pulse. A magnitude of the repetition frequency control signal is controlled such that the measured pulse phase difference matches with a target value of the pulse phase difference.

5 Claims, 6 Drawing Sheets

(51) Int. Cl.
*H01S 3/10* (2006.01)
*H01S 3/139* (2006.01)
*H01S 3/23* (2006.01)

(52) U.S. Cl.
CPC ............... *H01S 3/137* (2013.01); *H01S 3/139* (2013.01); *H01S 3/23* (2013.01); *H01S 3/2383* (2013.01); *H01S 3/1307* (2013.01); *H01S 3/1394* (2013.01)

(56) References Cited

U.S. PATENT DOCUMENTS

| | | | |
|---|---|---|---|
| 6,396,856 | B1 | 5/2002 | Sucha et al. |
| 8,306,078 | B2 | 11/2012 | Yamashita et al. |
| 8,718,108 | B2 | 5/2014 | Yamashita et al. |
| 2002/0097761 | A1 | 7/2002 | Sucha et al. |
| 2003/0185255 | A1 | 10/2003 | Ye |
| 2008/0165355 | A1 | 7/2008 | Yasui et al. |
| 2009/0296749 | A1 | 12/2009 | Sucha et al. |
| 2011/0170875 | A1* | 7/2011 | Yamashita et al. ............ 398/182 |
| 2011/0216791 | A1 | 9/2011 | Yamashita |
| 2012/0155500 | A1* | 6/2012 | Yamashita et al. .............. 372/32 |
| 2012/0163404 | A1* | 6/2012 | Yamashita et al. .............. 372/32 |
| 2013/0010818 | A1 | 1/2013 | Sucha et al. |

FOREIGN PATENT DOCUMENTS

| | | |
|---|---|---|
| JP | 10-96610 | 4/1998 |
| JP | 4782889 B1 | 7/2011 |
| JP | 4786767 B1 | 7/2011 |
| WO | 2006/092874 | 9/2006 |
| WO | 2011/062114 | 5/2011 |

OTHER PUBLICATIONS

Office Action issued in German Counterpart Patent Appl. No. 112013003959.1, dated Aug. 27, 2015.

* cited by examiner

PULSE LIGHT SOURCE, AND METHOD FOR STABLY CONTROLLING PHASE DIFFERENCE BETWEEN PULSE LASER LIGHTS

FIELD OF THE INVENTION

The present invention relates to control of a repetition frequency of a laser light pulse.

BACKGROUND ART

Conventionally, there are known devices that vary a difference in repetition frequency between two lasers by vertically fluctuating a repetition frequency of a slave laser, while keeping a repetition frequency of a master laser constant (see, for example, Patent Document 1 (Patent Publication No. 4786767)).

In this device, the slave laser includes a piezoelectric element. The device is designed to add a component vertically fluctuating (for example, a sinusoidal voltage) to a voltage which is to be applied to a piezo driver for driving the piezoelectric element (see, for example, FIGS. 1 and 3 of Patent Document 1).

SUMMARY OF INVENTION

However, even the application of the sinusoidal voltage to the piezo driver does not always permit the repetition frequency of the slave laser to exhibit a sine wave-like pattern. For example, the repetition frequency of the slave laser varies according to the displacement of the piezoelectric element. The displacement of the piezoelectric element depends on the temperature of the environment of the piezoelectric element even under the same voltage applied to the piezoelectric element. In some cases, the repetition frequency of the slave laser does not exhibit the sine wave due to the change in temperature of the environment of the piezoelectric element.

Accordingly, it is an object of the present invention to precisely control a difference in repetition frequency between two lasers.

According to the present invention, a pulse light source is adapted to feed-back control a repetition frequency control signal from a repetition frequency control signal source in accordance with a phase difference between two pulse laser lights.

According to the pulse light source of the present invention, lasers that output the two pulse laser lights may include: a master laser that outputs a master laser light pulse whose repetition frequency is controlled to a predetermined value; and a slave laser that outputs a slave laser light pulse, wherein the pulse light source includes: a phase difference detector that detects a phase difference between an electric signal having a frequency of the predetermined value, and an electric signal based on a light intensity of the slave laser light pulse; a loop filter that removes a high-frequency wave component of an output from the phase difference detector; an adder that adds a repetition frequency control signal output from the repetition frequency control signal source and having a certain repetition cycle, to an output from the loop filter; and a pulse phase difference detector that measures a pulse phase difference which is a phase difference between the master laser light pulse and the slave laser light pulse, wherein the repetition frequency of the slave laser light pulse varies depending on an output from the adder, and a magnitude of the repetition frequency control signal is controlled such that the measured pulse phase difference matches with a target value of the pulse phase difference.

According to the pulse light source of the present invention, a resonator length of the slave laser may change depending on the output from the adder.

According to the pulse light source of the present invention, the slave laser may include a piezoelectric element, the output of the adder is fed to the piezoelectric element, and the resonator length of the slave laser changes by expansion and contraction of the piezoelectric element.

According to the present invention, the pulse light source may further include: a master-side phase difference detector that detects a phase difference between an electric signal having the frequency of the predetermined value, and an electric signal based on a light intensity of the master laser light pulse; and a mater-side loop filter that removes a high-frequency component of the output from the mater-side phase difference detector, wherein a repetition frequency of the master laser light pulse changes in accordance with an output from the master-side loop filter.

According to the present invention, a method stably controls a phase difference of a pulse laser light in a light sampling device or a terahertz imaging device.

MODES FOR CARRYING OUT THE INVENTION

In the following, preferred embodiment of the present invention will be described with reference to the accompanying drawings.

Figure 1:
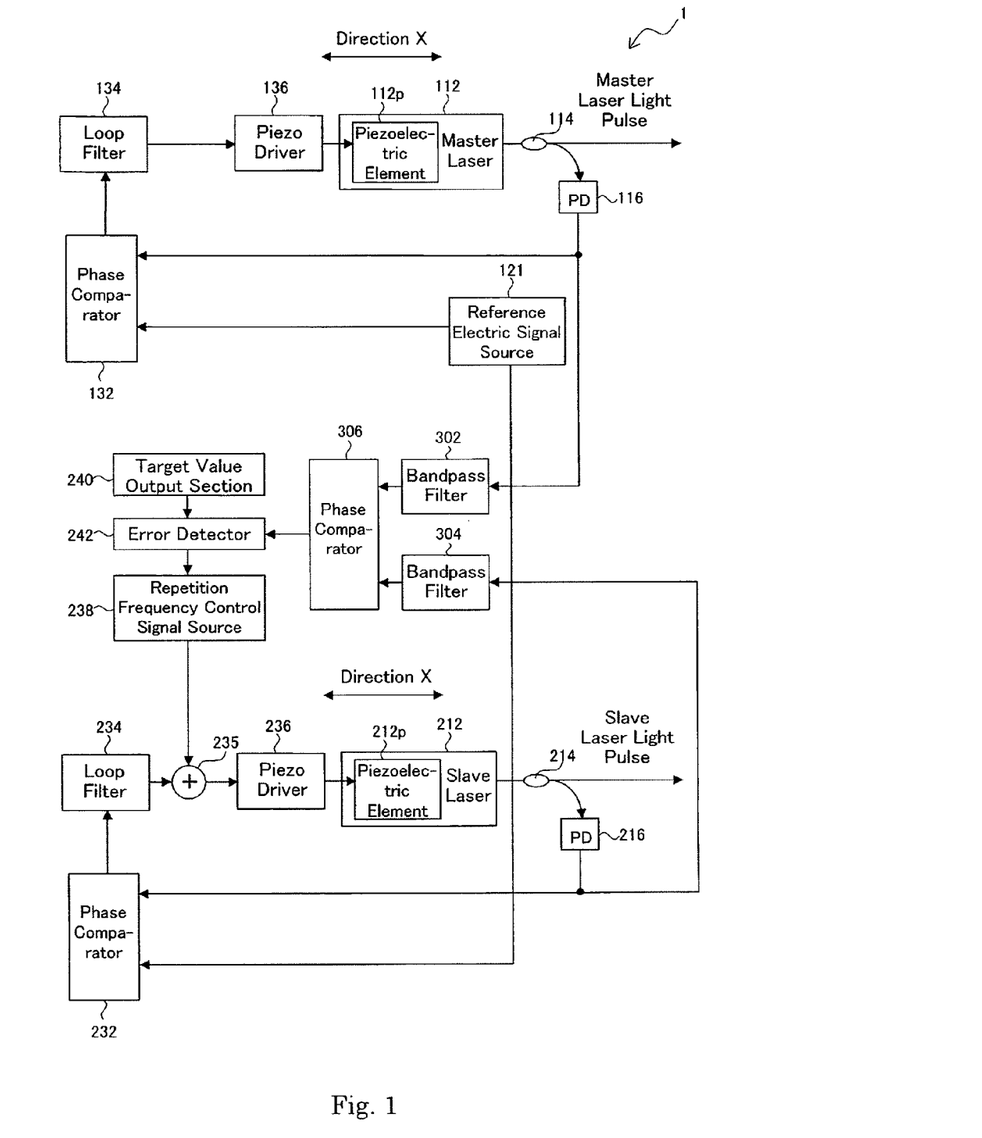
FIG. 1 shows a functional block diagram of the configuration of a pulse light source 1 according to one embodiment of the invention.

FIG. 1 shows a functional block diagram of the configuration of a pulse light source 1 according to one embodiment of the invention.

The pulse light source 1 in this embodiment of the invention includes a master laser 112, an optical coupler 114, a photodiode 116, a reference electric signal source 121, a phase comparator (master-side phase difference detector) 132, a loop filter (master-side loop filter) 134, a piezo driver 136, a slave laser 212, an optical coupler 214, a photodiode 216, a phase comparator (phase difference detector) 232, a loop filter 234, an adder 235, a piezo driver 236, a repetition frequency control signal source 238, a target value output section 240, an error detector 242, bandpass filters 302 and 304, and a phase comparator (pulse phase difference detector) 306.

The pulse light source 1 feed-back controls the repetition frequency control signal source 238 according to a phase difference between two pulse laser lights (master laser light pulse, and slave laser light pulse).

The master laser 112 outputs the master laser light pulse. Note that the repetition frequency of the master laser light pulse is controlled to a predetermined value. The predetermined value is equal to the frequency (for example, 50 MHz) of a reference electric signal output from the reference electric signal source 121.

The master laser 112 has a piezoelectric element 112p. The piezoelectric element 112p is adapted to be expanded and contracted in the direction X (in the lateral direction of FIG. 1) by amplifying a voltage of output from the loop filter 134 by the piezo driver 136 and applying the amplified voltage to the piezoelectric element. The expansion and contraction of the piezoelectric element 112p in the direction X changes a laser resonator length of the master laser 112. The change in laser resonator length changes the repetition frequency of the master laser light pulse.

The optical coupler 114 receives a master laser light pulse output from the master laser 112, and outputs the pulse to the photodiode 116 and the outside, respectively, at a power ratio of, for example, 1:9. Specifically, an optical power from the master laser light pulse applied to the photodiode 116 is 10% of that from the master laser light pulse output from the master laser 112.

The photodiode (master-side photoelectric conversion section) 116 receives a master laser light pulse from the optical coupler 114 to convert the master laser light pulse into an electric signal. The repetition frequency of the master laser light pulse is controlled to 50 MHz.

The reference electric signal source 121 outputs a reference electric signal having a frequency of the predetermined value (for example, 50 MHz).

The phase comparator (master-side phase difference detector) 132 detects and outputs a phase difference between an output from the reference electric signal source 121 and an output from the photodiode 116. Note that the output from the photodiode 116 is an electric signal based on the light intensity of the master laser light pulse.

The loop filter (master-side loop filter) 134 removes a high-frequency component from the output of the phase comparator 132.

The piezo driver 136 is, for example, a power amplifier, and amplifies the output from the loop filter 134. The output from the piezo driver 136 is fed to the piezoelectric element 112p. In this way, the piezoelectric element 112p is expanded and contracted in the direction X. Note that the piezoelectric element 112p is expanded and contracted such that the phase difference detected by the phase comparator 132 becomes a constant value (for example, 0 degree, 90 degrees, or −90 degrees). Thus, the repetition frequency of the master laser light pulse can be precisely matched with the frequency of the reference electric signal (for example, 50 MHz).

The slave laser 212 outputs the slave laser light pulse.

The slave laser 212 has a piezoelectric element 212p. The piezoelectric element 212p is adapted to be expanded and contracted in the direction X (in the lateral direction of FIG. 1) by amplifying a voltage of output from the adder 235 by the piezo driver 236 and applying the amplified voltage to the piezoelectric element. The expansion and contraction of the piezoelectric element 212p in the direction X changes a laser resonator length of the slave laser 212. The change in laser resonator length changes the repetition frequency of the slave laser light pulse.

The optical coupler 214 is substantially the same component as the optical coupler 114, and receives a slave laser light pulse output from the slave laser 212, and outputs the pulse to the photodiode 216 and the outside, respectively, at a power ratio of, for example, 1:9.

The photodiode (photoelectric conversion portion) 216 is substantially the same component as the photodiode 116. The photodiode 216 receives a slave laser light pulse from the optical coupler 214 and converts the slave laser light pulse into an electric signal. The repetition frequency of the slave laser light pulse is controlled to a value obtained by adding a value corresponding to the repetition frequency control signal to 50 MHz (frequency of the reference electric signal) (see FIG. 2(c)).

The phase comparator (phase difference detector) 232 is substantially the same component as the phase comparator 132, and detects and outputs a phase difference between an output from the reference electric signal source 121 and an output from the photodiode 216. Note that the output from the photodiode 216 is an electric signal based on the light intensity of the slave laser light pulse.

The loop filter 234 is substantially the same component as the loop filter 134, and removes a high-frequency component from the output of the phase comparator 232.

The piezo driver 236 is substantially the same component as the piezo driver 136, and amplifies the output from the adder 235. The output from the piezo driver 236 is fed to the piezoelectric element 212p. In this way, the piezoelectric element 212p is expanded and contracted in the direction X. The piezoelectric element 212p is expanded and contracted such that the phase difference detected by the phase comparator 232 becomes a constant value (for example, 0 degree, 90 degrees, or −90 degrees). Thus, the repetition frequency of the slave laser light pulse can be matched with a value (around 50 MHz) obtained by adding a value corresponding to the repetition frequency control signal to 50 MHz (frequency of the reference electric signal).

The adder 235 adds the repetition frequency control signal to the output of the loop filter 234 to output the obtained signal.

The repetition frequency control signal sources 238 is, for example, any waveform generator, and outputs the repetition frequency control signal. The repetition frequency control signal has a certain repetition cycle. When taking the time on the lateral axis, the repetition frequency control signal can be also considered to exhibit a sine wave (see FIG. 2(a)), or can also be considered to repeatedly increase and decrease linearly (see FIG. 4(a)). The repetition frequency control signal is a signal with a repetition frequency, for example, of about 250 Hz.

The bandpass filter 302 is a filter that takes out a component of the output at about 50 MHz (frequency of the reference electric signal) from the photodiode 116, or near a high-order harmonic (100 MHz, 150 MHz, etc.) of 50 MHz.

The bandpass filter 304 is a filter that takes out a component of the output from the photodiode 216 at about 50 MHz (frequency of the reference electric signal), or near a high-order harmonic (100 MHz, 150 MHz, etc.) of 50 MHz.

The phase comparator (pulse phase difference detector) 306 detects and outputs a phase difference between the output from the bandpass filter 302 and the output from the bandpass filter 304. The phase difference between the output from the bandpass filter 302 and the output from the bandpass filter 304 is a phase difference between the master laser light pulse and the slave laser light pulse (pulse phase difference).

The target value output section 240 outputs a target value of the pulse phase difference.

The error detector 242 detects a difference (an error) between the target value of the pulse phase difference output from the target value output section 240 and an output (measured pulse phase difference) from the phase comparator 306 to feed the difference to the repetition frequency control signal source 238.

The repetition frequency control signal source 238 controls the magnitude of the repetition frequency control signal based on the error detected by the error detector 242 such that the output (measured pulse phase difference) (measured value) from the phase comparator 306 is matched with the target value of the pulse phase difference. For example, when the target value is larger than the measured value (that is, when the error is negative), the repetition frequency control signal is set larger. When the target value is smaller than the measured value (that is, when the error is positive), the repetition frequency control signal is set smaller.

Next, the operation of the embodiment in the present invention will be described below.

(1) Before Outputting of Repetition Frequency Control Signal

In this case, the operation of the pulse light source 1 is substantially the same as the normal PLL circuit. That is, the repetition frequency of each of the master laser light pulse and the slave laser light pulse is 50 MHz.

An operation for setting the repetition frequency of the master laser light pulse to 50 MHz will be described below. The same goes for the repetition frequency of the slave laser light pulse.

The phase comparator 132 compares a phase of the output from the photodiode 116 with that of the output from the reference electric signal source 121 to detect a phase difference between both phases, thereby outputting the phase difference. The output from the phase comparator 132 has its high-frequency component removed by the loop filter 134, and then amplified by the piezo driver 136 to be fed to the piezoelectric element 112p. The piezoelectric element 112p is expanded and contracted such that the phase difference detected by the phase comparator 132 becomes a constant value (for example, 0 degree, 90 degrees, or −90 degrees). In this way, the repetition frequency of the master laser light pulse can be precisely matched with the frequency of the reference electric signal, 50 MHz.

Suppose that no disturbance occurs after matching the repetition frequency of each of the master laser light pulse and the slave laser light pulse with a predetermined value f0 (=50 MHz), the repetition frequency of each of the master laser light pulse and the slave laser light pulse can be kept to the predetermined value, if the voltage applied to the piezoelectric elements 112p and 212p is kept constant.

Figure 2:
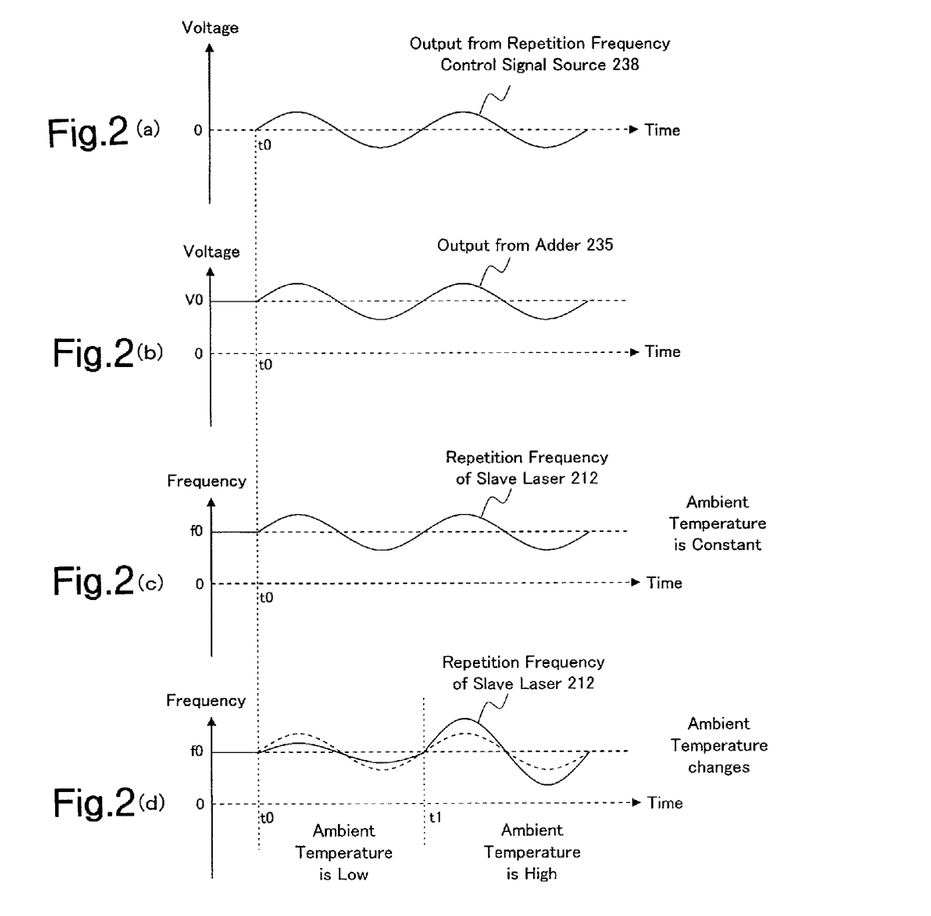
FIGS. 2(a), 2(b), 2(c), and 2(d) are diagrams showing an output from the repetition frequency control signal source 238 (FIG. 2(a)), an output from the adder 235 (FIG. 2(b)), the repetition frequency of the slave laser 212 when the ambient temperature is constant (FIG. 2(c)), and a virtual example of the repetition frequency of the slave laser 212 when the ambient temperature changes (FIG. 2(d))

FIGS. 2(a), 2(b), 2(c), and 2(d) are diagrams showing an output from the repetition frequency control signal source 238 (FIG. 2(a)), an output from the adder 235 (FIG. 2(b)), the repetition frequency of the slave laser 212 when the ambient temperature is constant (FIG. 2(c)), and a virtual example of the repetition frequency of the slave laser 212 when the ambient temperature changes (FIG. 2(d)).

Referring to FIGS. 2(a) to 2(d), in a period of time from time 0 to time t0, the repetition frequency of the slave laser light pulse is kept at a predetermined value, f0, while keeping the output from the adder 235 at V0 (see FIGS. 2(b) to 2(d)). Likewise, in the period of time from the time 0 to t0, the repetition frequency of the master laser light pulse is kept at the predetermined value f0.

At the time t0, the output of the repetition frequency control signal is started.

(2) After Outputting of Repetition Frequency Control Signal (when the Ambient Temperature is Constant)

Suppose that the repetition frequency control signal output from the repetition frequency control signal source 238 exhibits, for example, a sine wave when the time is shown in the lateral axis (see FIG. 2(a)).

Then, the output from the adder 235 vertically varies from V0(see FIG. 2(b)).

When the output from the adder 235 increases (decreases), the voltage applied to the piezoelectric element 212p also becomes higher (lower), causing the expansion (contraction) of the piezoelectric element 212p. Here, when the piezoelectric element 212p is expanded (contracted), the laser resonator length of the slave laser 212 is designed to be shorter (longer). Then, the repetition frequency of the slave laser 212 is increased (decreased).

Like the output from the adder 235, the repetition frequency of the slave laser 212 also vertically varies (see FIG. 2(c)). The value of the repetition frequency of the slave laser 212 vertically varying corresponds to the repetition frequency control signal.

On the other hand, the repetition frequency of the master laser light pulse is not specifically varied.

That is, the repetition frequency of the slave laser 212 is vertically varied, while the repetition frequency of the master laser 112 is constant, which can vary a difference in repetition frequency between the two lasers.

Note that the bandpass filter 302 takes out a component of the output from the photodiode 116 at 50 MHz (frequency of the reference electric signal), or near a high-order harmonic (100 MHz, 150 MHz, etc.) of 50 MHz. The bandpass filter 304 takes out a component of the output from the photodiode 216 at 50 MHz (frequency of the reference electric signal), or near a high-order harmonic (100 MHz, 150 MHz, etc.) of 50 MHz. The phase comparator 306 detects and outputs a phase difference (pulse phase difference) between the output from the bandpass filter 302 and the output from the bandpass filter 304.

Taking into consideration changes in ambient temperature as the disturbance, under the constant ambient temperature, the pulse phase difference is identical to a target value with no errors. That is, the output from the target value output section 240 is identical to the output from the phase comparator 306, resulting in an output of zero (0) from the error detector 242. The repetition frequency control signal source 238 has no errors, and thus its output is still the sine wave as it is.

(3) After Outputting of Repetition Frequency Control Signal (when the Ambient Temperature Changes)

Note that when the ambient temperature changes, the pulse phase difference is not identical to the target value, causing errors. This is based on the following reasons.

In general, the displacement of the piezoelectric element changes depending on the ambient temperature of the piezoelectric element even under the same voltage applied to the piezoelectric element. For example, when the ambient temperature of the piezoelectric element is high (low), the displacement of the piezoelectric element becomes larger (smaller). The repetition frequency of the slave laser light pulse is determined by the magnitude of the displacement of the piezoelectric element 212p, which further determines the pulse phase difference. If the displacement of the piezoelectric element 212p changes due to the changes in ambient temperature, then the pulse phase difference varies. Thus, when the ambient temperature changes, the pulse phase difference varies from the target value, and is not identical to the target value, causing errors.

FIG. 2(d) is a diagram showing a virtual example of the repetition frequency of the slave laser 212 when the ambient temperature changes. The description as the "virtual example" is based on the assumption that the output from the repetition frequency control signal source 238 has the form of a sine wave as it is. Referring to FIG. 2(d), the repetition frequency of the slave laser 212 is represented by a curve with a dotted line when the ambient temperature is constant.

Suppose that in the period of time from the times t0 to t1, the ambient temperature is low, and after the time t1, the ambient temperature is high. In this case, in the period of time from the times t0 to t1, the variations in frequency becomes small as compared to the case where the ambient temperature is constant. After the time t1, the variations in frequency become large as compared to the case where the ambient temperature is constant.

The repetition frequency control signal source 238 changes the magnitude of the repetition frequency control signal based on the error detected by the error detector 242, causing the repetition frequency of the slave laser 212 to approach the state shown in FIG. 2(c).

Figure 3A:
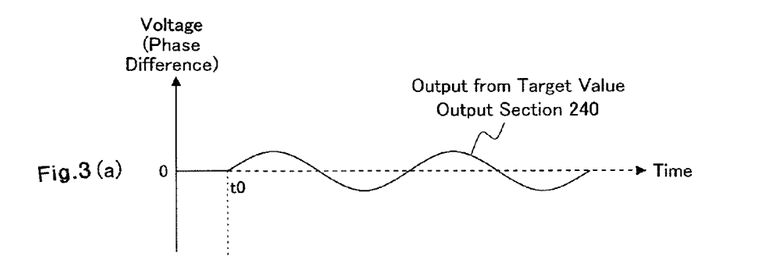
FIGS. 3(a), 3(b), 3(c), and 3(d) are diagrams showing an output from the target value output section 240 (FIG. 3(a)), an output from the phase comparator 306 (FIG. 3(b)), an output from the repetition frequency control signal source 238 (FIG. 3(c)), and an output from the adder 235 (FIG. 3(d)), when the ambient temperature changes.
Figure 3B:
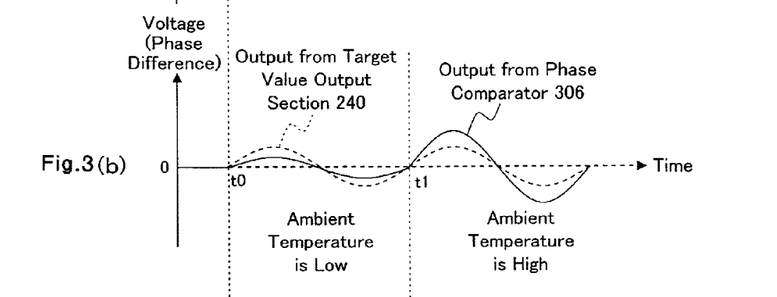
Figure 3C:
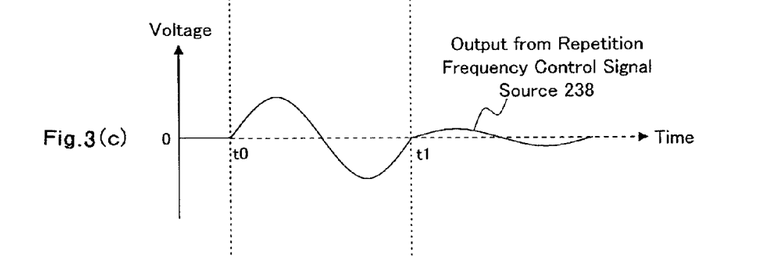
Figure 3D:
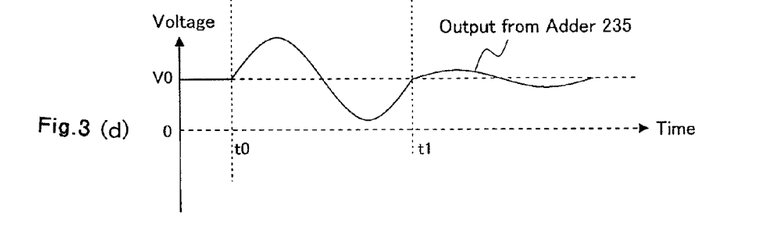

FIGS. 3(a), 3(b), 3(c), and 3(d) are diagrams showing an output from the target value output section 240 (FIG. 3(a)), an output from the phase comparator 306 (FIG. 3(b)), an output from the repetition frequency control signal source 238 (FIG. 3(c)), and an output from the adder 235 (FIG. 3(d)), when the ambient temperature changes.

Referring to FIG. 3(a), the output from the target value output section 240 exhibits a sine wave. When the repetition frequency of the slave laser 212 is shown in FIG. 2(c) while the repetition frequency of the master laser 112 is constant, the output from the target value output section 240 indicates a phase difference between both laser pulse lights. Note that the output from the phase comparator 306 is one obtained by replacing the phase difference by the voltage (for example, the phase difference of 180 degrees is indicated as 1.8 V). Together with this, the output from the target value output section 240 is also one obtained by replacing the phase difference by the voltage.

Referring to FIG. 3(b), in the period of time from the times t0 to t0, variations in frequency become small as compared to the case where the ambient temperature is constant. Thus, in the period of time from the times t0 to t1, the amplitude of the output from the phase comparator 306 is smaller than that of the output from the target value output section 240. After the time t1, variations in frequency become large as compared to the case where the ambient temperature is constant. Thus, after the time t1, the amplitude of the output from the phase comparator 306 is larger than that of the output from the target value output section 240.

The error detector 242 detects a difference (an error) between the target value of the pulse phase difference output from the target value output section 240 and an output (measured pulse phase difference) from the phase comparator 306 to feed the difference to the repetition frequency control signal source 238.

Referring to FIG. 3(c), the repetition frequency control signal source 238 controls the magnitude of the repetition frequency control signal based on the error detected by the error detector 242.

For example, when the target value is larger than the measured value (that is, when the error is negative), the repetition frequency control signal is set larger. When the target value is smaller than the measured value (that is, when the error is positive), the repetition frequency control signal is set smaller. Thus, the repetition frequency control signal source 238 increases the amplitude of the repetition frequency control signal in the period of time from the times t0 to t1, and decreases the amplitude of the repetition frequency control signal after the time t1.

Referring to FIG. 3(d), the output from the adder 235 is one obtained by adding a voltage V0 to the voltage shown in FIG. 3(c).

In the period of time from the times t0 to t1, the ambient temperature is low, which might decrease the amplitude of the repetition frequency of the slave laser 212. However, by increasing the amplitude of the repetition frequency control signal, the amplitude of the repetition frequency of the slave laser 212 can be increased to approach a repetition frequency of the slave laser 212 that is obtained when the ambient temperature is constant.

After the time t1, the ambient temperature is high, which might increase the amplitude of the repetition frequency of the slave laser 212. However, by decreasing the amplitude of the repetition frequency control signal, the amplitude of the repetition frequency of the slave laser 212 can be decreased to approach the repetition frequency of the slave laser 212 that is obtained when the ambient temperature is constant.

This embodiment of the present invention can maintain the phase difference (further, a difference in frequency) between the master laser pulse light and the slave laser pulse light to the target value, even though disturbance (for example, changes in ambient temperature) occurs.

Note that modified examples of an output of the repetition frequency control signal will be described below.

Figures 4A, 4B, 4C, 4D:
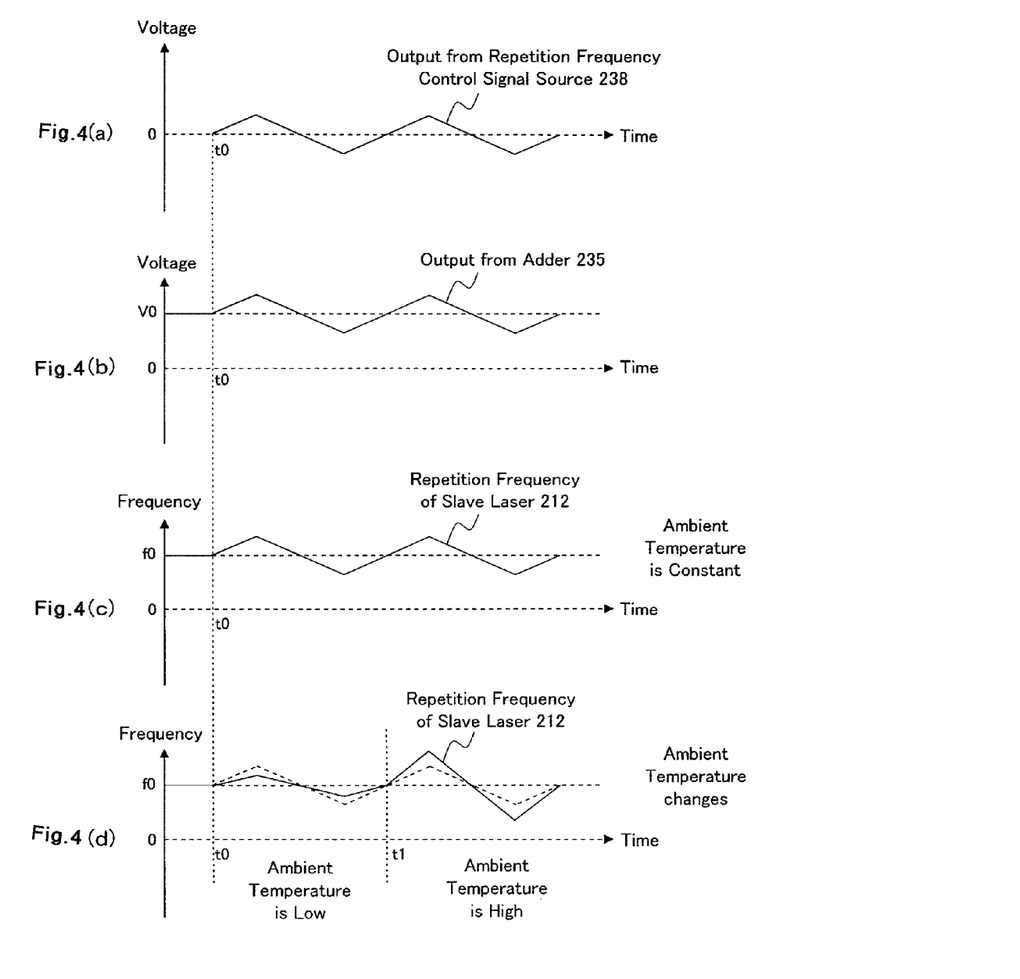
FIGS. 4(a), 4(b), 4(c), and 4(d) are diagrams showing the modified examples of the output from the repetition frequency control signal, FIG. 4(a) showing the output from the repetition frequency control signal source 238, FIG. 4(b) showing an output from the adder 235, FIG. 4(c) showing the repetition frequency from the slave laser 212 when the ambient temperature is constant, and FIG. 4(d) showing a virtual example of the repetition frequency of the slave laser 212 when the ambient temperature changes (FIG. 4(d))

FIGS. 4(a), 4(b), 4(c), and 4(d) are diagrams showing the modified examples of the output from the repetition frequency control signal, FIG. 4(a) showing the output from the repetition frequency control signal source 238, FIG. 4(b) showing an output from the adder 235, FIG. 4(c) showing the repetition frequency from the slave laser 212 when the ambient temperature is constant, and FIG. 4(d) showing a virtual example of the repetition frequency of the slave laser 212 when the ambient temperature changes (FIG. 4(d)).

When taking the time in a lateral axis, the repetition frequency control signal is considered to linearly increase and decrease repeatedly (see FIG. 4(a)). In this case, the output from the adder 235 (see FIG. 4(b)) and the repetition frequency of the slave laser 212 (see FIGS. 4(c) and 4(d)) are substantially the same as above.

Figure 5A:
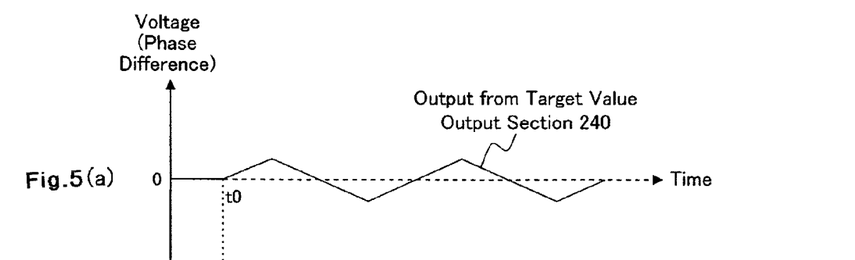
FIGS. 5(a), 5(b), 5(c), and 5(d) are diagrams showing modified examples of outputs of the repetition frequency control signal, FIG. 5(a) showing an output from the target value output section 240, FIG. 5(b) showing an output from the phase comparator 306, FIG. 5(c) showing an output from the repetition frequency control signal source 238, and FIG. 5(d) showing an output from the adder 235, when the ambient temperature changes.
Figure 5B:
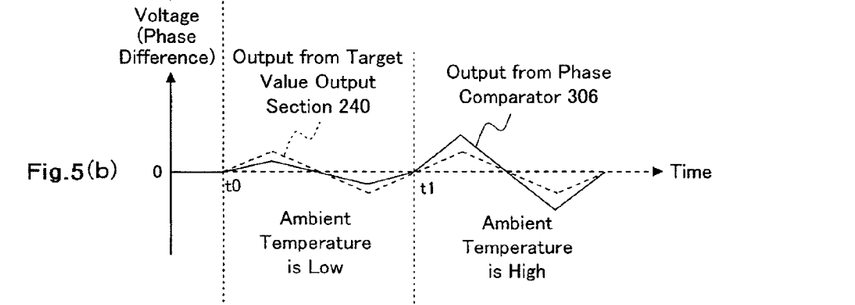
Figure 5C:
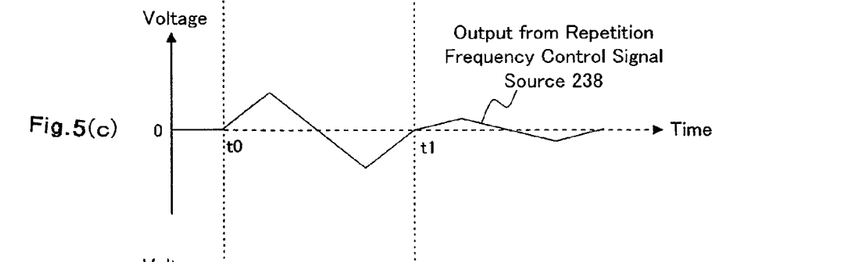
Figure 5D:
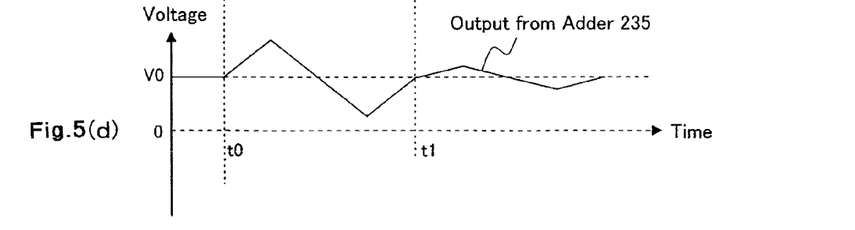

FIGS. 5(a), 5(b), 5(c), and 5(d) are diagrams showing modified examples of outputs of the repetition frequency control signal, FIG. 5(a) showing an output from the target value output section 240, FIG. 5(b) showing an output from the phase comparator 306, FIG. 5(c) showing an output from the repetition frequency control signal source 238, and FIG. 5(d) showing an output from the adder 235, when the ambient temperature changes.

The output from the target value output section 240 (see FIG. 5(a)), the output from the phase comparator 306 (see FIG. 5(b)), the output from the repetition frequency control signal source 238 (see FIG. 5(c)), and the output from the adder 235 (see FIG. 5(d)) are also considered to linearly increase and decrease repeatedly when taking the time in a lateral axis.

Figure 6:
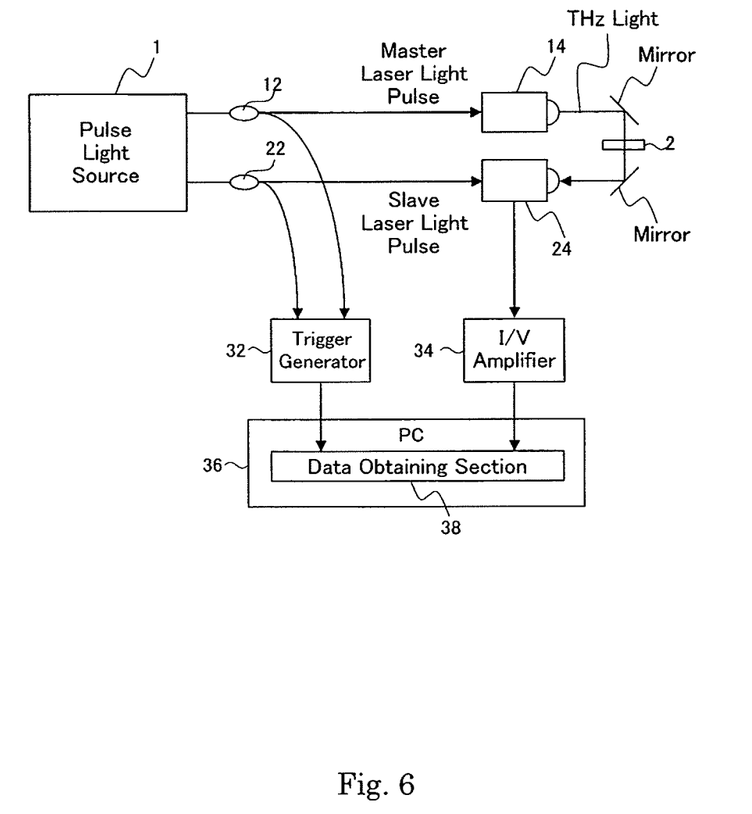
FIG. 6 is a block diagram showing the configuration of the measuring device using the THz light.

Note that the pulse light source 1 can be used for a measuring device (light sampling device) using a terahertz (THz) light. FIG. 6 is a block diagram showing the configuration of the measuring device using the THz light. Such a measuring device includes the pulse light source 1, optical couplers 12 and 22, a THz light generator 14, a THz light detector 24, a trigger generator 32, an I/V amplifier 34, a PC (personal computer) 36, and a data obtaining section 38.

For example, the master laser light pulse is fed to the THz light generator 14 (for example, a photoconductive switch) to generate the THz light, which is irradiated to an object 2 to be measured. The THz light that penetrates through the object 2 to be measured or is reflected from the object 2 to be measured is fed to the THz light detector 24 (for example, a photoconductive switch). By feeding the slave laser light pulse to the THz light detector 24, the THz light can be detected. Since there is a difference in repetition frequency between the master laser light pulse and the slave laser light pulse, a plurality of points of the waveform of the THz light penetrating through or reflected by the object 2 to be measured can be observed (taken as an optical sample). The THz light detector 24 detects the THz wave to output an electric current.

In order to sample the light, parts of the master laser light pulse and the slave laser light pulse are branched from the optical couplers 12 and 22 to be fed to the trigger generator 32. When receiving both the master laser light pulse and slave laser light pulse, the trigger generator 32 outputs a trigger signal. The I/V amplifier 34 receives an electric current from the THz light detector 24, converts the electric current into a voltage, and amplifies the voltage. The PC (personal computer) 36 has a data obtaining section 38, and the data obtaining section 38 obtains the output from the I/V amplifier 34, starting from the time when the trigger signal is received from the trigger generator 32.

The result obtained by the data obtaining section 38 may be displayed in the form of any image (by a terahertz imaging device).

The invention claimed is:

1. A pulse light source that is adapted to feed-back control a repetition frequency control signal from a repetition frequency control signal source in accordance with a phase difference between two pulse laser lights, wherein lasers that output the two pulse laser lights comprise:
   a master laser that outputs a master laser light pulse whose repetition frequency is controlled to a predetermined value; and
   a slave laser that outputs a slave laser light pulse, wherein the pulse light source comprises:
   a phase difference detector that detects a phase difference between an electric signal having a frequency of the predetermined value, and an electric signal based on a light intensity of the slave laser light pulse;
   a loop filter that removes a high-frequency wave component of an output from the phase difference detector;
   an adder that adds a repetition frequency control signal output from the repetition frequency control signal source and having a certain repetition cycle, to an output from the loop filter; and
   a pulse phase difference detector that measures a pulse phase difference which is a phase difference between the master laser light pulse and the slave laser light pulse, wherein
   the repetition frequency of the slave laser light pulse varies depending on an output from the adder, and
   a magnitude of the repetition frequency control signal is controlled such that the measured pulse phase difference matches with a target value of the pulse phase difference.

2. The pulse light source according to claim 1, wherein a resonator length of the slave laser changes depending on the output from the adder.

3. The pulse light source according to claim 2, wherein the slave laser includes a piezoelectric element,
   the output of the adder is fed to the piezoelectric element, and
   the resonator length of the slave laser changes by expansion and contraction of the piezoelectric element.

4. The pulse light source according to claim 1, further comprising:
   a master-side phase difference detector that detects a phase difference between an electric signal having the frequency of the predetermined value, and an electric signal based on a light intensity of the master laser light pulse; and
   a mater-side loop filter that removes a high-frequency component of the output from the mater-side phase difference detector, wherein
   a repetition frequency of the master laser light pulse changes in accordance with an output from the master-side loop filter.

5. A method for feed-back controlling a repetition frequency signal in accordance with a phase difference between two pulse laser lights, the method comprising:
   detecting a master laser light pulse whose repetition frequency is controlled to a predetermined value;
   detecting a slave laser light pulse;
   detecting a phase difference between an electric signal having a frequency of the predetermined value, and an electric signal based on a light intensity of the slave laser light pulse;
   removing a high-frequency wave component of an output from the detected phase difference to provide a loop filter output;
   adding a repetition frequency control signal having a certain repetition cycle to the loop filter output; and
   measuring a pulse phase difference which is a phase difference between the master laser light pulse and the slave laser light pulse,
   wherein
   the repetition frequency of the slave laser light pulse varies depending on the added repetition frequency control signal and the loop filter output, and
   a magnitude of the repetition frequency control signal is controlled such that the measured pulse phase difference matches with a target value of the pulse phase difference.

* * * * *